United States Patent
Murphree et al.

[15] 3,641,485
[45] Feb. 8, 1972

[54] ECHO SIMULATION MEANS

[72] Inventors: Francis J. Murphree, Winter Park; Michael T. Marrero, Casselberry, both of Fla.

[73] Assignee: The United States of America as represented by the Secretary of the Navy

[22] Filed: May 25, 1970

[21] Appl. No.: 40,179

[52] U.S. Cl. .................................340/3 E, 35/10.4, 340/5 D
[51] Int. Cl. ................................................G01s 9/66
[58] Field of Search ..........................340/3 R, 5 D, 3 E, 5 R; 35/10.4

[56] References Cited

UNITED STATES PATENTS 3,180,295   4/1965   Niederer ..............................340/5 D
3,555,165   1/1971   Ettenhofer et al. .....................35/10.4

Primary Examiner—Richard A. Farley
Attorney—Richard S. Sciascia, John W. Pease and Harvey A. David

[57] ABSTRACT

Synthetic sonar echoes are generated in response to a sonar signal by utilizing a delay line, time compression technique to generate a reconstructed waveform which is then sampled to provide a pulsed input to a shift register means having taps spaced therealong corresponding to structural highlight positions along a target. The shift register is caused to serve as a variable delay line by varying the sampling and shift rate in response to aspect angle as determined by phase-sensitive logic means. The taps feed a network of attenuators and filters which produce across an output resistor an electrical signal which can be amplified and used to drive a sound projector to produce the desired simulated echo.

8 Claims, 4 Drawing Figures

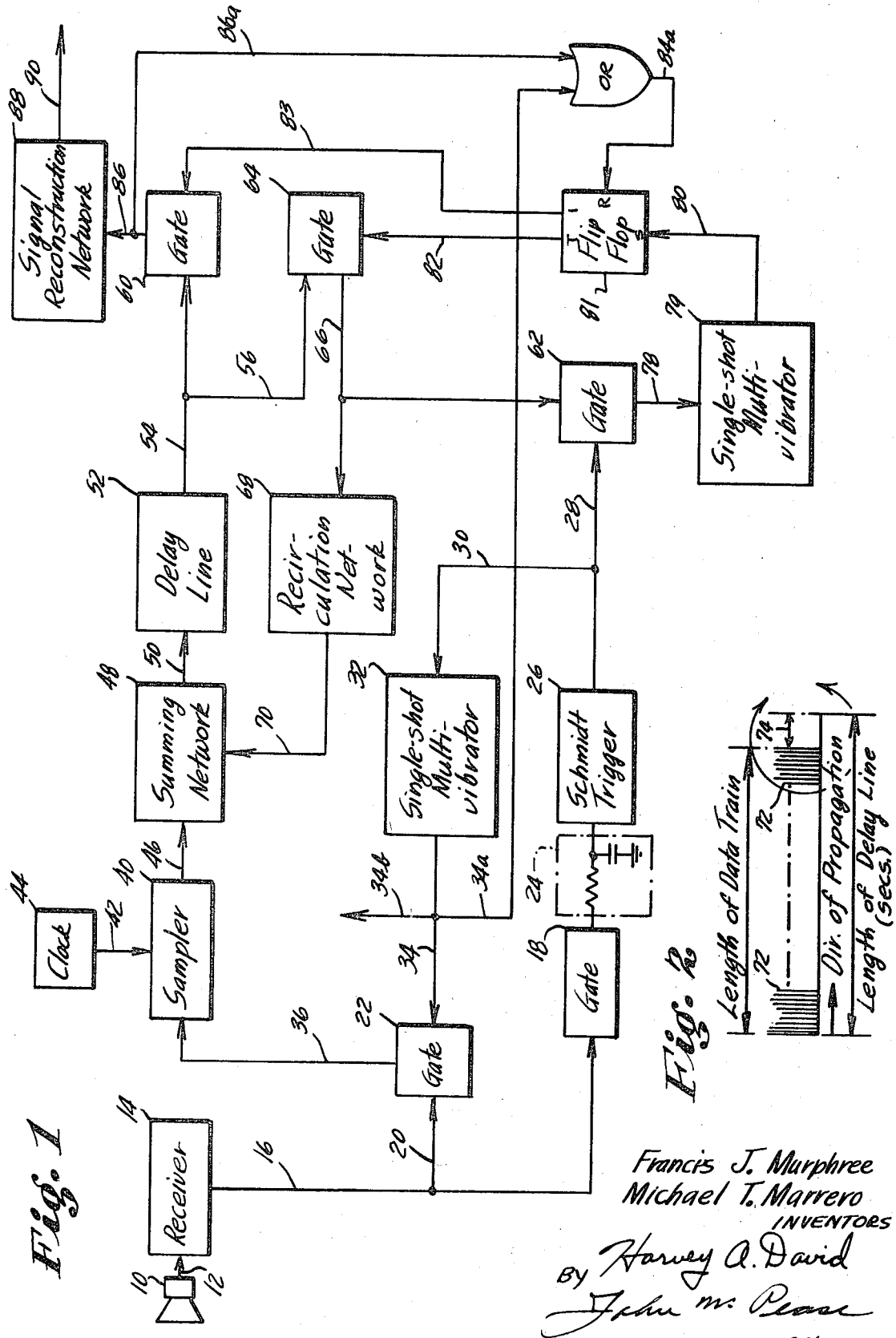

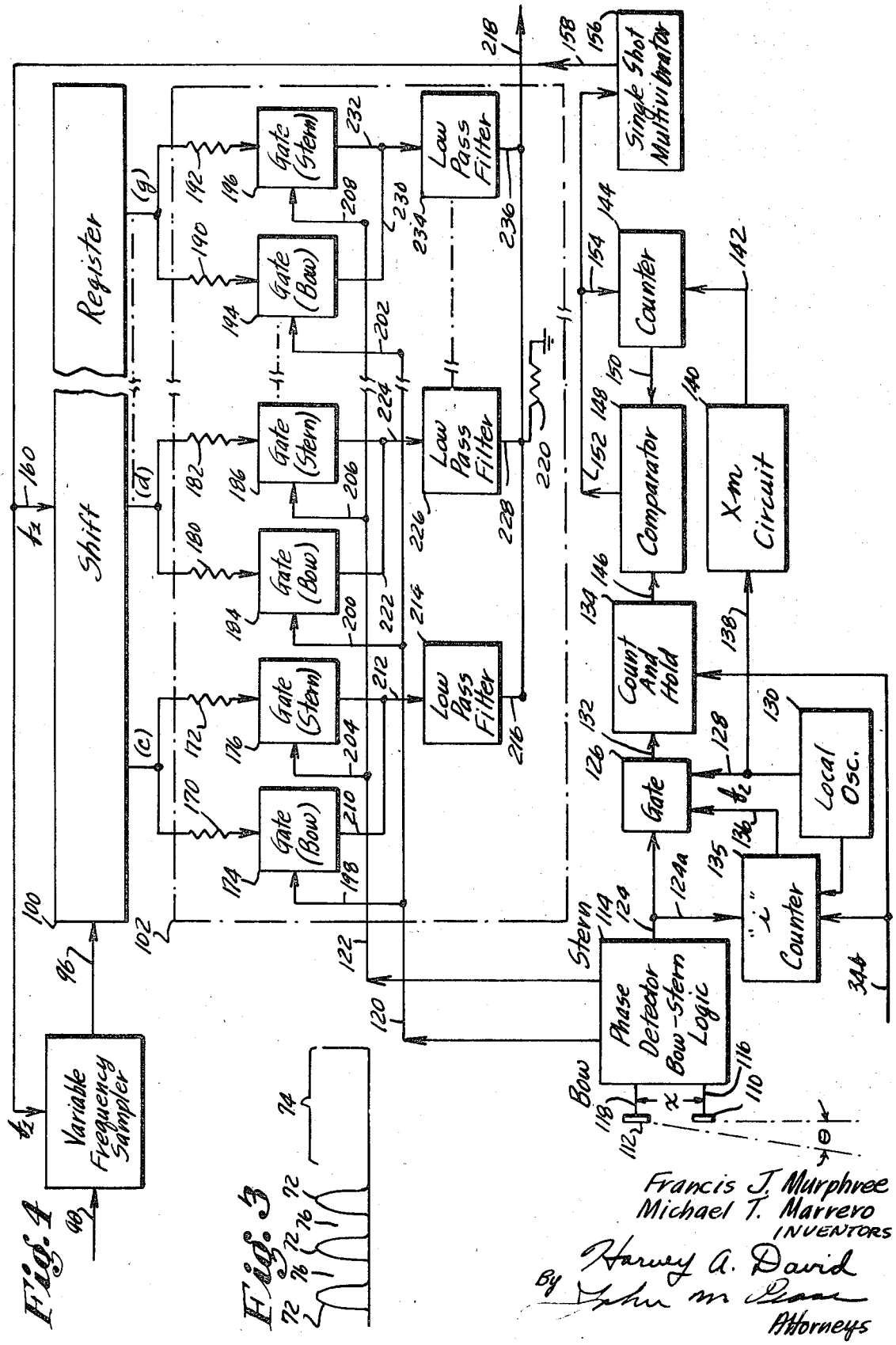

ECHO SIMULATION MEANS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sonar echo simulators, and more particularly to devices which provide signals which are intended to realistically simulate echoes from actual targets, typically submarines and surface vessels.

Such echo simulators are desirable for use in mobile targets for submarines to track in training exercises, in decoy devices for misleading enemy antisubmarine measures, and in stationary or "dry-land"-type sonar training devices.

In general the mobile submarine simulators have a hydrophone which receives a sonar signal which is then processed in a manner to resemble an echo, amplified and then applied to a sound projector which provides the return to the tracking sonar. Because of the fact that the hydrophone and the projector are physically close on the mobile simulator, it is necessary, in order to avoid feedback problems, to introduce a time delay between the receiving of the signal and transmitting the simulated echo. Accordingly, it has been the practice heretofore to utilize means such as a tape recording to introduce such a delay.

Such devices being mechanically dependent are not fully satisfactory in the environment of use under discussion.

Another major shortcoming of prior echo simulators used in targets buoys, mobile simulators, and the like has been that they have used echo repeaters or transponders which did not return aspect-dependent echoes except as such dependence was incidentally introduced by the directivity patterns of the hydrophones and projectors employed.

Inasmuch as real targets, notably submarines, have a relatively large length-to-diameter ratio, aspect-dependent returns are necessary to provide an adequate degree of realism.

Other shortcomings have been the inability of the echo generator to increase the echo length at appropriate times to simulate wake returns, the inability to cause the simulated echo to fluctuate in amplitude with slight changes in aspect as is the case with actual echoes, and the inability to provide realistic echo highlights which are characteristic of the particular target vessel the echoes of which are being simulated.

Additionally, the small size of mobile submarine simulators (usually on the order of size of a conventional torpedo), decoy buoys, and the like, has prevented the development of realistic echo generation equipment according to prior techniques.

BRIEF SUMMARY OF THE INVENTION

With the foregoing in mind it is a principal object of the present invention to provide an improved echo simulator which will overcome the aforementioned shortcomings and which is particularly adaptable in its ability to provide echo simulations which vary in a realistic manner with changing aspect.

It is another object of this invention to accomplish the foregoing through the provision of novel circuitry and logic combinations which can take advantage of the characteristics of recent developments in component devices such as integrated circuit shift registers having many stages available in a reasonably sized and priced package. In general, the invention utilizes shift register means as the approximate equivalent of a tapped, electrically variable delay line to generate the echo, the effective length determining the overall echo length, and the tap separation the "highlight" separation. The effect on the echo length of changes in target aspect are produced by changing the effective shift register delay length as a function of aspect.

The invention may be further said to reside in certain novel combinations and arrangements of parts by which the foregoing objects and advantages are achieved, as well as others which will become apparent from the following description of the preferred embodiment when read in conjunction with the accompanying sheets of drawings.

BRIEF DESCRIPTION OF THE DRAWINGS

FIG. 1 is a diagrammatic illustration, in block form, of a read-in and readout circuit portion of an echo simulator embodying the invention;

FIG. 2 is a graphical illustration of a grouping of time-compressed data samples in the delay line element of FIG. 1;

FIG. 3 is a view, on an expended scale, of the portion of FIG. 2 within the circle 3; and FIG. 4 is a diagrammatic illustration, in block form, of the echo construction circuitry.

DESCRIPTION OF THE PREFERRED EMBODIMENT

In the form of the invention described hereinafter, and with particular reference now to the read-in and readout circuitry of FIG. 1a, there is provided a hydrophone 10 which is adapted to receive a sonar signal, for example from a submarine tracking a mobile submarine simulator embodying the echo simulator being described. This read-in and readout circuitry provides, in a novel manner, the necessary delay to avoid feedback problems. The hydrophone 10 converts the sonar signal to an electrical signal which is applied via line 12 to a receiver 14. The receiver 14 amplifies the electrical signal and applies it via line 16 to a detector 18 and via line 20 to an AND-gate 22. The detector detects or demodulates the signal and applies it via a filter 24 to a Schmidt trigger 26 (or a functionally equivalent device). If the detected signal passed by the filter 24 to the Schmidt trigger 26 is of sufficient amplitude, the Schmidt trigger renders an output pulse on lines 28, 30 to a single-shot multivibrator 32 triggering it into its on condition.

The output of the single-shot multivibrator 32 during its on condition is applied as shown by line 34 to the gate 32. The gate 22 is thereby enabled to pass the output of the receiver 14 as shown by line 36 to a sampler 40.

The sampler 40 is responsive to clock signals, received via line 42 from a clock signal generator 44, to periodically sample the amplified sonar signal and render an output on line 46 consisting of periodic data samples. The data sample output on line 46 is applied as one input to a summing network 48, the other input to which is derived in a manner which will be made apparent as this description proceeds. The output of the summing network is passed via line 50 to the input of memory means in the form of a delay line 52 having a delay slightly less than the sampling period determined by the clock signal generator 44.

The delay line output is fed as shown by lines 54, 56, and 58, to a readout gate 60 and to a recirculation gate 64. Gate 64 passes the delay line output via line 66, a recirculation unit 68, and a line 70 to the summing network 48 for reapplication to the memory of delay line 52 just before the next data sample from the sample 46 is applied to the delay line. In the manner of the well-known "Deltic," or delay line time compressor, this process continues until a large number of samples is stored in the delay line 52. The output of gate 64 is also applied, via line 66a, as an input to the gate 62.

The total number of samples taken after a signal triggers the single-shot multivibrator 32 is limited to less than the delay line capacity by that single-shot multivibrator which has a period such that it closes the gate 22 before the delay line 52 is filled. As a result of this action, the data samples 72 in the delay line 52 are "bunched" as illustrated in FIG. 2 with a gap 74 or portion of the line not filled with data samples at the right-hand end of the line. Separations 76 of the data samples 72 are illustrated in the expanded view of FIG. 3, and the gap 74 is much greater than the separations 76 between the data samples. This fact is used to simplify the readout at the original sampling rate of the "time-compressed" data.

The gate 62, which is connected by line 28 to the Schmidt trigger 26, and by a line 78 to a retriggerable single-shot multivibrator 79, closes when the Schmidt trigger is triggered on by the presence of a signal at the input to the detector 18. The multivibrator 79 is connected by line 80 to a flip-flop 81. One output of the flip-flop 81 is connected by line 82 to the gate 64. The other output is connected by line 83 to the gate 60. The readout gate 60, is in turn, connected by a line 86 to a signal reconstruction network 88. The initial output conditions of the flip-flop 81 are established by a pulse applied to its reset input from the single-shot multivibrator 32 via line 34a, an OR-circuit 84, and a line 84a from the OR circuit. These initial conditions cause the recirculation gate 64 to be on and the readout gate 60 to be off while information is being loaded into the memory or delay line 52.

When the input signal to Schmidt trigger 26 ceases, the Schmidt trigger reverses state and the gate 62 is turned on, starting the readout cycle. (The fact that it will also be on for long periods of time when a signal is not present is not important since gate 22, being closed under these circumstances, keeps noise from reaching sampler 40.)

As soon as the gate 62 opens, the single-shot multivibrator 79 is triggered into its unstable state by the first sample pulse to reach it; thereafter succeeding sample pulses continually retrigger it on before it fully returns to its stable state. At the end of the stored data train it does return to its stable condition. This sudden change in level is used to trigger the flip-flop 81 into the "set" condition causing the gate 64 to close (opening the recirculation loop) and gate 60 to open. The first sample of the data train will therefore be fed to the signal reconstruction network 88 but it will not be applied to the recirculation network 68 since gate 64 is closed. The same data sample that is applied to the signal reconstruction network is also applied via line 86a and through the OR-circuit 84 to the reset terminal of the flip-flop 81 causing it to change state, and therefore turn gate 64 on and turn gate 60 off. This action permits recirculation of the data to resume, minus the first sample. It also causes the single-shot multivibrator 79 to retrigger. The single-shot multivibrator 79 stays in the unstable condition until the end of the pulse train, as previously. When gate 60 is thereupon opened and gate 64 closed, the second sample is dumped to the reconstruction network 88 as was the first sample, and so on. Ultimately all samples are fed to the signal reconstruction network 88 and the delay line 52 is empty.

Because of the fact that the delay line stores all of the samples from a given sonar signal and because they are then readout at the original sampling rate, there is no need for further apparatus to determine the pulse length of the original sonar signal for later use in generating a synthetic echo which is a function of that pulse length.

The signal reconstruction network 88, typically comprising a low-pass filter means the function of which is to smooth the discrete output pulses from gate 60 into a continuous wave, passes this reconstructed wave via line 90 to the echo simulation portion of the apparatus, which portion will now be described with reference to FIG. 4.

The reconstructed wave on line 90 is applied to a variable frequency sampler 64 which samples the reconstructed wave at a variable sampling rate or frequency $f_1$. The sampling rate $f_1$ is approximately proportional to sec $\theta$, where $\theta$ is the past angle of the vessel of which an echo is to be simulated. The manner in which a signal of sampling rate $f_1$ is generated in the case where the invention is used in a mobile submarine simulator will later be described in some detail.

The output sample pulses of the sample 94 are applied via line 96 as the input to a shift register 100 having N stages and which shifts at the sampling rate $f_1$. By varying the sampling and shifting rate $f_1$ the shift register 100 is operated as a variable length delay line which has a number of taps represented by c, d,—g to which are connected an echo synthesizing and summing network 102 also described in more detail hereinafter.

The minimum sampling frequency $F_{ref}$, having a period $T_{max}$, is determined by the signal bandwidth or the highest signal frequency. Increasing the sampling frequency above this value does not adversely affect the sampling process.

As noted above, the shift register 100 is operated as a variable length delay line and, as such, it is varied in length to represent the apparent length of the simulated vessel as it changes in aspect angle.

Because the time required for a signal to propagate through the shift register 100 is a function of both the shift rate $f_1$, and the number of stages and since the number of stages N is a constant, the shift register can be used as a variable length delay line by changing the sample and shift rate as mentioned above. The number N of stages required in the shift register 100 is approximately equal to the time required for sound to propagate at velocity C from one end of a target (simulated vessel) of length S to the other end and return, divided by the maximum allowable sampling period $T_{max}$.

Thus, $N=(2S/C)/T_{max}$.  [Eq. 1]

In the case where echoes from a vessel of 325 feet length $S$ are being simulated, and the velocity of sound in sea water is taken as a nominal 5,000 feet/sec., and $T_{max}$ is taken as 0.001 sec., then:

$2S/C$=0.13 sec., and
$N$=0.13/0.001 sec.=130.

It should be noted at this point that if, after the sampling process by sampler 94, an analog to digital conversion is made, with say each analog data point represented by three bits, then three times as many stages N would be required, and so on.

The approximate length L of an echo from a long target is:

$$L=2S/C \mid \cos \theta \mid + t \text{ sec.,}$$  [Eq. 2]

where $t$ is the insonification pulse length.

From Eq. 1, $$2S/C=NT_{max}.$$  [Eq. 3]

Accordingly, the shift register delay $NT$ for any aspect angle $\theta$ may be written:

$$NT=NT_{max} \mid \cos \theta \mid \text{sec.,}$$  [Eq. 4]

where $T$ is the sampling period for a given $\theta$ and $T=T_{max}\cos \theta$. The sampling frequency is:

$1/T=f_1=1/T_{max} \mid \cos \theta \mid$ or
$f_1=F_{ref}(1/\mid \cos \theta \mid )=F_{ref} \sec \theta$  [Eq. 5]

This desired relation between the sampling frequency $f_1$ and the aspect angle is achieved automatically in the following manner. A pair of hydrophones 110, 112 are mounted on the mobile submarine simulator (or buoy or other devices embodying the invention) and are spaced by a distance $x$ along the long axis thereof. The difference in arrival times of a sonar pulse propagated in a direction at an angle $\theta$ (aspect angle of the simulator) is detected by a phase-detecting bow/stern logic means 114 connected to receive the hydrophone outputs via lines 116, 118. The logic 114 provides first signal conditions on lines 120, 122 if the aspect angle is less than ±90°, that is to say a bow aspect, and reversed signal conditions on those lines if the aspect angle is greater than ±90°, that is to say a stern aspect. The logic 114 may conveniently comprise phase-detection circuitry similar to that described in U.S. Pat. No. 3,383,690 to E. A. Keller, together with flip-flop means (not shown) controlled by that circuitry such that the flip-flop is triggered to the set state upon detection of a bow aspect by the phase detector, and is triggered to the reset state upon detection of a stern aspect by the phase detector. The signal conditions on lines 120, 122 are utilized in the echo reconstruction and summing network 102 as will presently be described. The logic further provides a gating signal output on line 124 having a length of $$(x/C) \mid \cos \theta \mid$$

This gating signal on line 124 is applied as an enabling input to a gate 126 which passes a signal of frequency $f_2$, derived via a line 128 from a local oscillator 130, as shown via line 132 to a count and hold circuit 134.

Approximately $(ixf_2/C)|\cos \theta|$ cycles will be passed by the gate 126 to be forced in the count and hold circuit 134, where $i$ is a predetermined number of signal frequency cycles during which local oscillator 130 is gated to counter 134.

To this end, a resettable, predetermined count $i$ counter 135 is connected by line 124a to the output of logic 114 and applies an inhibit signal via line 136 as one input of gate 126 after $i$ signal cycles have occurred. The gate 126 is conveniently a field effect transistor of the type having two independent gating means. The counter 135 is reset by the output of the single-shot multivibrator 32 (FIG. 1) via line 34b.

The local oscillator signal $f_2$ is also applied via line 138 to a multivibrator circuit 140 which multiplies the signal $f_2$ by a factor $m$. The output $mf_2$ of the multiplier circuit 140 is applied as shown by line 142 to a resettable counter 144. The count in the count and hold circuit 134 is applied via a line 146 as one input to a comparator 148, while the count in the counter 144 is applied via a line 150 to the comparator as a second input thereto. Each time the count in the counter 144 reaches that in the count and hold circuit 134 the comparator produces an output represented by lines 152 and 154 which resets the counter 144 to zero, starting its counting cycle over, and that also triggers a single-shot multivibrator 156. The output of the multivibrator 156 occurs at the sampling and shifting rate $f_1$ and is applied via lines 158 and 160 to the variable frequency sampler 94 and the shift register 100, respectively. The time required to read out the count held in the count and hold circuit 134 is $$\frac{i\frac{x}{C}|\cos\theta|f_2 + a}{mf_2} \text{ sec.} \quad \text{which is}$$

equal to $$\frac{ix|\cos\theta|}{mc} + \frac{a}{mf_2} \text{ sec.}$$

The constant $a$ is introduced by starting counter 134 from an initial count $a$ greater than zero. By appropriate choice of $a$, the simulated target can be made to have finite length when $\theta=90°$, or what is the same thing, the maximum value of $f_1$ can be limited. Resetting of the counter 134 to the value $a$ is accomplished by the output of the multivibrator 32 via lines 34b and 34c. The readout frequency $f_1$ may then be stated as $$f_1 = \frac{1}{\frac{ix|\cos\theta|}{mc} + \frac{a}{mf_2}} \text{ Hz}$$

which approaches $$f_1 = \frac{mc}{ix|\cos\theta|} \text{ Hz when } \theta \text{ is small}$$

and $$f_1 = \frac{mf_2}{a} \text{ Hz when } \theta \text{ is large.}$$

Since $f_1 \cong F_{ref}\frac{1}{|\cos\theta|}$, (except for large $\theta$)

then, by comparison:
$$F_{ref} = m\ C/i\ x, \text{ and}$$
$$m = i \times F_{ref}/C.$$

For example, if $F_{ref}=1,000$ Hz.,
$i=1, x=0.25$ feet, and $C=5,000$ ft./sec.
then $m=50\times10^{-3}$
Conversely, given that $m=50\times10^{-3}$, then:

$$F_{ref} = \frac{50\times10^{-3}\times5000}{.25} = 1000\ Hz.$$

Since $T_{max} = 1/F_{ref}$, $T_{max} = 0.001$ sec.
The length of each gate to the counter 134 is determined by the geometry of the hydrophone array, and in this example is
$$x/C = 0.25/5,000 = 50\times10^{-6} \text{ sec.}$$
The maximum count stored in 134 is $i(x/C)f_2$; $f_2$ can be any reasonable value; assume that it is equal to $2\times10^6$ Hz. Assuming, as before, that $i=1$, then:

$$(i\times f_2)/C = 50\times10^{-6}\times2\times10^6 = 100.$$

This is the maximum number that will be stored in the counter. The time required to read out this count, neglecting $a$, is $$\frac{100}{2\times10^6}\times50\times10^{-3} = 10^{-3} = .001 \text{ sec.}$$

It will be understood, of course, that the foregoing figures, frequencies, multiplication factors, and the like are given by way of example to explain the operation of the apparatus, and that other values may be chosen to suit the circumstances under which the invention is employed.

The taps $c, d, -g$, etc., are placed along the shift register 100 at locations mainly corresponding to the structural "highlights" of the vessel for which echoes are to be simulated. The echo construction and summing network 102 comprises means for synthesizing an echo from the outputs at the various taps, and in accordance with whether the simulated target vessel is presenting a bow or a stern aspect to the tracking sonar.

To this end, each tap is connected through first and second attenuator resistors to a bow gate and a stern gate, respectively. Thus, the tap $c$ is connected through resistors 170, 172, to a bow gate 174 and a stern gate 176, respectively, the tap $d$ is connected through resistors 180, 182 to a bow gate 184 and a stern gate 186, respectively, and the tap $g$ is connected through resistors 190, 192 to a bow gate 194 and a stern gate 196, respectively. Of course, the shift register 100 may have as many taps as are necessary, within the limitations of the number N of stages, to represent vessel highlights and wake, the illustrated taps and associated elements of the network 102 being representative only.

The bow gates 174, 184, 194 are connected as shown by lines 120, 198, 200, and 202 to be enabled upon detection of a bow aspect by the bow-stern logic 114. Similarly, the stern gates 176, 186, 196 are connected as shown by lines 122, 204, 206, and 208 to be enabled upon detection of a stern aspect by the bow-stern logic 114.

The outputs of the bow and stern gates 174, 176 associated with tap $c$ are connected via lines 210 and 212 to the input of a network which is typically in the form of a low-pass filter 214, the output of which is connected via lines 216 and 218 to a summing register 220. Similarly, the outputs of the bow and stern gates 184, 186 associated with tap $d$ are connected via lines 222 and 224 to the input, of a filter 226, the output of which is connected via lines 228 and 218 to the resistor 220, and the outputs of the bow and stern gates 194, 196 associated with tap $g$ are connected via lines 230 and 232 to the input of a filter 234, the output of which is connected via lines 236 and 218 to the resistor 220.

The resistor such as 170, 172, 180, 182, 190, 192, determine the amplitudes or strengths of the highlights. The filters such as 214, 226, and 234, in combination with the resistor 220, serve to produce an output signal on line 218 which is approximately the electrical equivalent of a sonar echo from a target vessel having predetermined highlight and wake characteristics represented by the shift register taps and the associated attenuator resistors.

The output from line 218 may be applied to suitable amplifier and sound-projecting means (not shown) to direct a simulated echo into the water surrounding the mobile target, whereby the tracking sonar will receive the synthetic echo and, in all respects, present the sonar operator with indications of the presence of a target having the structural characteristics, wake, aspect, angle, etc., provided for in the echo simulation portion of the invention described herein.

Obviously, many modifications and variations of the present invention are possible in the light of the above teachings. It is therefore to be understood that within the scope of the appended claims the invention may be practiced otherwise than as specifically described. Thus, it is apparent that readout of the memory 52, FIG. 1, could be begun before the ed of the illuminating transmission by using single-shot multivibrator 32 to turn gate 62 off for some time less than required to load the memory. Gate 22, instead of being controlled by single-shot multivibrator 32 would now be turned on directly by Schmidt trigger 26 as soon as it was operated by the input signal, and would stay on as long as the input signal existed.

It should also be noted that the apparatus described in FIG. 4 could, with some modification, be used for the creation of artificial reverberation and other musical effects.

What is claimed is:

1. Apparatus for generating aspect-dependent simulated echoes from targets having a relatively large length to diameter ratio in response to an insonifying pulse, comprising:
   read-in and readout means operative to provide a delayed signal representative to said insonifying pulse;
   variable rate sampler means connected to said read-in readout means and operative to sample said delayed signal in response to a sample rate signal having a frequency $f_1$ and to provide output pulse data representative of said delayed signal;
   shift register means connected to receive the output of said variable rate sampler means and to advance said data at a shift rate equal to $f_1$;
   a plurality of outputs derived from selected stages along said shift register means;
   a plurality of bow aspect gates, each connected to one of said outputs;
   a plurality of stern aspect gates, each connected to one of said outputs;
   phase detector means responsive to said insonifying signal to provide an output representative of target aspect and operative to enable selected ones of said gates, depending upon the aspect of the target;
   means, responsive to the output of said phase detector means, for generating said sample rate and shift rate signal at a frequency $f_1$ which varies as a function of target aspect angle; and
   echo-synthesizing means comprising a plurality of attenuators connected to the outputs of said gates and connected to summing means whereby a simulated echo signal having predetermined highlights is synthesized.

2. Apparatus as defined in claim 1, and wherein:
   said shift register means comprises N stages, where N is approximately equal to an integral multiple of the time that would be required for sound to propagate in a supporting medium from one end of a simulated target to the other end and return, divided by the maximum sampling period of said variable rate sampler.

3. Apparatus as defined in claim 1, and wherein said means for generating said sample and shift rate signals at frequency $f_1$ comprises:
   phase detector means operative to provide an output signal representative of simulated target aspect angle;
   local oscillator means providing signals at frequency $f_2$;
   count and hold circuit means;
   gate means connected to receive said local oscillator signal and responsive to the output of said phase detector means to pass said local oscillator signals to said count and hold circuit;
   counter means responsive to the outputs of said phase detector means and said local oscillator to apply an inhibit signal to said gate means after a predetermined number "$i$" of cycles of said oscillator output have been passed to said count and hold circuit;
   a multiple circuit responsive to said local oscillator and operative to provide an output frequency which is a predetermined multiple of $f_2$;
   second counter means for counting the output cycles of said multiplier circuit; and
   comparator means responsive to each occurrence of an equality of count between said count and hold circuit and said second counter means to provide an output signals, the output signals of said comparator means occurring at said frequency $f_1$.

4. Apparatus as defined in claim 1, and wherein:
   each of said plurality of attenuators comprises a low-pass filter means.

5. Apparatus as defined in claim 1, and wherein said read-in and readout means comprises:
   means for receiving said insonifying pulse and providing a signal representative thereof;
   sampler means operative to periodically sample said insonifying pulse and to provide an output of data samples;
   delay line, time compressor means including recirculation means operative to group said samples in time-compressed form;
   a signal reconstruction network; and
   means for providing a delayed readout of said data samples at a real time rate to said signal reconstruction network; said readout being initiated at a predetermined time after cessation of said insonifying pulse;
   said signal reconstruction network being operative to combine the data sample readout into said delayed signal representative of said insonifying pulse.

6. Apparatus as defined in claim 2, and wherein said means for generating said sample and shift rate signals at frequency $f_1$ comprises:
   phase detector means operative to provide an output signal representative of simulated target aspect angle;
   local oscillator means providing signals at frequency $f_2$;
   count and hold circuit means;
   gate means connected to receive said local oscillator signal and responsive to the output of said phase detector means to pass said local oscillator signals to said count and hold circuit;
   counter means responsive to the outputs of said phase detector means and said local oscillator to apply an inhibit signal to said gate means after a predetermined number "$i$" of cycles of said oscillator output have been passed to said count and hold circuit;
   a multiplier circuit responsive to said local oscillator and operative to provide an output frequency which is a predetermined multiple of $f_2$;
   second counter means for counting the output cycles of said multiplier circuit; and
   comparator means responsive to each occurrence of an equality of count between said count and hold circuit and said second counter means to provide an output signal, the output signals of said comparator means occurring at said frequency $f_1$.

7. Apparatus as defined in claim 6, and wherein said read-in and readout means comprises:
   means for receiving said insonifying pulse and providing a signal representative thereof;
   sampler means operative to periodically sample said insonifying pulse and to provide an output of data samples;
   delay line, time compressor means including recirculation means operative to group said samples in time-compressed form;
   a signal reconstruction network; and
   means for providing a delayed readout of said data samples at a real time ratio to said signal reconstruction network, said readout being initiated at a predetermined time after cessation of said insonifying pulse;
   said signal reconstruction network being operative to combine the data sample readout into said delayed signal representative of said insonifying pulse.

8. Apparatus as defined in claim 7, and wherein:
   each of said plurality of attenuators comprises a low-pass filter means.

* * * * *